Patented May 29, 1951

2,554,667

UNITED STATES PATENT OFFICE 2,554,667

PROCESS FOR BREAKING PETROLEUM EMULSIONS

Melvin De Groote, St. Louis, Mo., assignor to Petrolite Corporation, Ltd., Wilmington, Del., a corporation of Delaware No Drawing. Application July 14, 1949, Serial No. 104,805

8 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products of compounds used as the demulsifying agent in said aforementioned processes or procedures, as well as the application of such chemical compounds, products, or the like, in various other arts and industries, along with the method for manufacturing said new chemical products or compounds which are of outstanding value in demulsification. See my copending application, Serial No. 104,806, filed July 14, 1949.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

In my two co-pending applications, Serial Nos. 104,801 and 104,802, both filed July 14, 1949, there was reference to breaking petroleum emulsions by means of certain specified compounds or compositions, and specifically in the first mentioned co-pending application the invention is set forth in the following language:

"A process for breaking petroleum emulsions of the water-in-oil type characterized by subjecting the emulsion to the action of a demulsifier including high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant."

The present application is analogous to the aforementioned co-pending application or applications with this difference: The initial products employed and subjected to oxypropylation are water-insoluble.

Summarizing the present invention in its broadest aspect it is concerned with a process for breaking petroleum emulsions of the water-in-oil type characterized by subjecting the emulsion to the action of a demulsifier including high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristic of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant.

For convenience, what is said hereinafter is divided into three parts. Part 1 is concerned with the description of the polyhydric reactants employed, as well as reference to other compounds, products, etc., so there may be a clear line of demarcation between the present invention and what may appear elsewhere. Part 2 is concerned with the preparation of the oxypropylated derivatives, and Part 3 is concerned with the use of an oxypropylated derivative as a demulsifier for petroleum emulsions of the water-in-oil type.

PART 1

The most readily available materials for use in the present process are polypentaerythritols. These products, beginning with dipentaerythritol up to and including decapentaerythritol meet the specified requirements in regard to water-insolubility, xylene-insolubility, molecular weight, number of hydroxyl radicals, etc. They are oxypropylation susceptible. Mono - pentaerythritol is fairly soluble in water, for instance, about 5% at room temperature. Di-pentaerythritol is soluble only to the extent of a few tenths of a per cent and thus, although monopentaerythritol is included as an initial reactant in my co-pending aforementioned applications Serial Nos. 104,801, and 104,802, both filed July 14, 1949, the polypentaerythritols beginning with dipentaerythritol is not included unless such product has received a pre-treatment with ethylene oxide or glycide, or the like, to render it water soluble to the extent of 1% or more. Not only is monopentaerythritol available in the open market but this is also true of the next two pentaerythritols, to wit, the di- and tri-. As to the preparation of these higher pentaerythritols, reference is made to U. S. Patent No. 2,462,049, dated February 15, 1949, to Wyler. The following table appears therein and is repeated for convenience:

*Constants of pentaerythritols*

| Type | Empirical Formula | Molecular Weight | Per Cent OH | Number of OH Groups |
| --- | --- | --- | --- | --- |
| Mono-pentaerythritol | $C_5H_{12}O_4$ | 136.15 | 49.98 | 4 |
| Di-pentaerythritol | $C_{10}H_{22}O_7$ | 254.30 | 40.13 | 6 |
| Tri-pentaerythritol | $C_{15}H_{32}O_{10}$ | 372.41 | 36.53 | 8 |
| Tetra-pentaerythritol | $C_{20}H_{42}O_{13}$ | 490.54 | 34.67 | 10 |
| Penta-pentaerythritol | $C_{25}H_{52}O_{16}$ | 608.67 | 33.53 | 12 |
| Hexa-Pentaerythritol | $C_{30}H_{62}O_{19}$ | 726.80 | 32.76 | 14 |
| Hepta-pentaerythritol | $C_{35}H_{72}O_{22}$ | 844.93 | 32.21 | 16 |
| Octa-pentaerythritol | $C_{40}H_{82}O_{25}$ | 963.06 | 31.79 | 18 |
| Nona-pentaerythritol | $C_{45}H_{92}O_{28}$ | 1,081.19 | 31.46 | 20 |
| Deca-pentaerythritol | $C_{50}H_{102}O_{31}$ | 1,199.32 | 31.20 | 22 |

It is to be noted that the polyhydric compounds herein employed are characterized in being compounds in which there is present only carbon, hydrogen, and oxygen. This does not mean that there may not be present some other radical such as an acyl radical, provided that the initial reactant is water-insoluble. This may be illustrated by tri-pentaerythritol monoacetate, tetra-pentaerythritol monoacetate, di-pentaerythritol hydroxy acetate, or the corresponding lactate, etc.

The same would be true of an ether, such as the mono-methyl ether, or the mono-ethyl ether if the above compounds are similar compounds, provided, of course, that the initial reactant meets all the requirements enumerated.

The various materials above described may, of course, be treated with some other alkylene oxide prior to oxypropylation provided the initial raw material still meets the requirements previously set forth in regard to water-insolubility, etc. The higher pentaerythritols mentioned in the above table may be treated with a single mole, or possibly two moles, of ethylene oxide, or possibly a mole of glycide, or a mole or several moles of buylene oxide, and the products so obtained is still perfectly satisfactory as an initial raw material provided all the previous requirements are met.

Other variations which can be mentioned include treatment with epichlorohydrin with subsequent de-hydrochlorination so as to form an epoxy ring followed, if desired, by reacting such terminal epoxy ring with an alcohol such as methyl alcohol, ethyl alcohol, propyl alcohol, butyl alcohol, or hexyl alcohol. It may be well to emphasize the fact that in preparing the polyol ethers herein specified, one does not get a single compound but rather a cogeneric mixture which can be characterized statistically in terms of the reactants or ratio of reactants rather than in terms of a single chemical compound. In producing the herein described products, I have employed 8 to 75 moles of propylene oxide per initial hydroxyl. Stated another way, starting with di-pentaerythritol, tri-pentaerythritol, or tetra-pentaerythritol, I have employed approximately 30 moles of propylene oxide per hydroxyl radical and in such instances where there is a large number of hydroxyl radicals I have employed up to 75 moles of propylene oxide. For most purposes, however, my preference is to stay in a lower range, to wit, somewhere between 15 to 40 moles of propylene oxide per initial hydroxyl radical. In this connection it is to be noted that the addition of 8 to 60 moles of an alkylene oxide per reactive hydroxyl is not unusual as illustrated, for example, in U. S. Patent 2,454,541 dated November 23, 1948, to Bock. Previous reference has been made to the fact that the peculiar properties of these compounds must be related in some manner to the high molecular weight on the one hand, and the absence of a hydrophobe group having 8 uninterrupted carbon atoms in a single group on the other hand, to say nothing about their peculiar space configuration.

Referring now to a class of materials not herein included, i. e., tetrahydric reactants, it is to be noted that if one adds as many as 60 moles of propylene oxide per hydroxyl then this alone produces the molecular weight of approximately 3500 per hydroxyl, or a total of 14,000 in all. Going to a hexahydric reactant, the molecular weight would be 50% higher or in the neighborhood of 20,000.

I have prepared compounds which, assuming that all the propylene oxide employed became part of the initial reactant, produced a mixture where the average molecular weight would be in the neighborhood of 25,000 and with 20,000 to 30,000 molecular weight as the upper limit. Unfortunately, there is no suitable method of determining such molecular weights and this point will be referred to briefly in the text in a subsequent paragraph.

In this particular connection it is rather interesting to note the effect of space configuration in the following respect. Di-pentaerythritol, for example, has a molecular weight of 254. In a derivative obtained by oxypropylation having a molecular weight of 9,000 or thereabouts, the di-pentaerythritol contributes about 2½% of the total molecule. In a compound having a molecular weight of 18,000, it contributes only about 1¼% of the total molecule and yet there is all the difference in the world between these compounds as far as superiority in demulsification is concerned, and compounds derived, for example, from methyl alcohol, ethyl alcohol, propyl alcohol, ethyleneglycol, propyleneglycol, or butylene glycol, by oxypropylation so as to be within the same molecular weight range.

In order to illustrate why the herein contemplated compounds or said products are co-generic mixtures and not single chemical compounds, and why they must be described in terms of manufacture, and molal ratio or percentage ratio of reactants, reference is made to a monohydric alcohol. The herein described initial reactant is a polyhydric alcohol having at least 4 hydroxyls. However, one need only consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide it is well known that one does not obtain a single constituent which, for sake of convenience, may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many, many times in the case of a tetrahydric compound and a hexahydric compound, or one having even a larger number of hydroxyls. This is particularly true when enough propylene oxide is added to give, at least on a statistical basis, assuming complete reaction, a compound having a molecular weight within the range previously specified.

Referring to the water-insoluble polypentaerythritols it will be noted that if the compound initially has sufficient hydroxyl groups, one or more such groups may be converted into an acetal or a ketal in the conventional manner and such product can be used as an initial reactant, provided it is still water-insoluble. Thus, it is seen that the oxygen atom may appear in the initial reactant as part of a hydroxyl radical, part of an ether radical, including inner ethers, or part of a ketal or acetal radical, or part of an acid radical.

Basically, the compounds herein described owe their peculiar properties to a number of factors previously enumerated, at least in part: (a) size of molecule; (b) shape of molecule as far as space configuration goes; (c) absence of a single hydrophobe group having as many as 8 uninterrupted carbon atoms in a single radical; (d) substantial insolubility in water; (e) solubility in xylene; and (f) such combination being obtained by the action of propylene oxide alone for all practical purposes.

Actually, it can be seen that certain variations could be made without detracting from the spirit of the invention, as, for example, one can start with a material such as dipentaerythritol and treat the dipentaerythritol with approximately 50 moles of propylene oxide and then with approximately 6 moles of glycide, and then with another 50 moles of propylene oxide. Actually, if 6 moles of glycide went on at the end of an intermediate structure and oxypropylation is resumed, the only thing that would happen is that there would be 12 terminal groups instead of 6. If one started with tripentaerythritol there still would be a larger number of terminal hydroxyls and this is true to even a greater degree if one employed penta-pentaerythritol. Actually, the introduction or interruption of a propylene oxide chain by a glycide radical obviously does not depart from this invention and is included within the expression "oxypropylation," for reasons which require no further explanation. The same thing is true if, at some stage in oxypropylation, one injected one or two ethylene radicals which would not offset other factors which complete the overall structure, as molecule size, the insolubility in water, and the solubility in xylene would all remain. If one used a mole of butylene oxide for each dipentaerythritol hydroxyl, again one would get the same effect for the reason that the overall picture has not been changed and there is no departure from the spirit of the invention. For that matter, one might use a few moles of ethylene oxide and a few moles of butylene oxide. Basically, the invention resides in what has been said previously, that size of the molecule, the absence of the hydrophobe group having 8 carbon atoms or more and propylene oxide chains, branched or straight chain for that matter, which ultimately change a water-insoluble xylene-insoluble material having a comparatively low molecular weight under 1200 in most instances (decapentaerythritol has 1,199) into a xylene-soluble material having a molecular weight in the neighborhood of several thousand, on up to 25,000 to 30,000 as previously pointed out, with the preferred range being in the neighborhood of 4,000 or thereabouts, to about 14,000 or thereabouts.

Reference is made to the initial statement in regard to the present invention insofar that reactants were characterized as being monomeric. The polypentaerythritol might be considered as polymers of mono-pentaerythritol and obtained by etherization. Reference to monomeric compounds in this application is not used in the sense to characterize the polypentaerythritols as polymeric compounds but to distinguish from certain materials not included as reactants and which are water-insoluble resins obtainable in various ways, as, for example, the treatment of polypentaerythritol and, in fact, monopentaerythritol with dicarboxy acids such as diglycollic acid or the like, or an acid of the following formula:

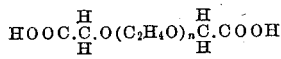

in which $n$ is a small number, usually less than 5 or 6. Such acids are obtained by treatment of a polyethyleneglycol with metallic sodium, followed by treatment with chloroacetic acid or by a procedure involving the use of acrylonitrile. This reaction for the conversion of a hydroxyl into a carboxyl is well known.

Previous reference has been made to the molecular weights being based on a statistical basis and on the assumption that complete reaction takes place between the two classes of reactants, particularly in the simplified situation in which only the polyhydric reactant and propylene oxide is used. It is well known that the usual method for determining molecular weight that is based either on an increase in boiling point or a decrease in the freezing point, is unsatisfactory for this or similar high molal materials. Other methods involving viscosities, osmotic pressure, or the like, lead to additional difference and thus, as far as I am aware, there is no really satisfactory method available. I have found that molecular weight estimates based on hydroxyl value are not satisfactory in these high molecular weight materials.

Previous reference has been made to the fact that I do not have to use the water-insoluble polyhydric compounds free from other functional groups but that there may be present functional groups such as ethers, aldehyde, ketone or carboxyl groups. The various groups enumerated may be introduced into the selected reactant in the usual manner. The group which can be introduced most readily is a low molal monocarboxy radical by use of an acid, such as acetic acid, hydroxyacetic acid, propionic acid, butyric acid, hexanoic acid, etc., and all that is required is that the initial reactant have a sufficiency of hydroxyl radicals as specified, and be water-insoluble, and otherwise meet the specified requirements. Particularly to be preferred, however, are those compounds which are stable at comparatively high temperatures, such as 150° to 170° C. This permits quick oxypropylation.

By and large, all the compounds indicated can be considered as polyhydric reactants having 4 or more hydroxyl radicals or derivatives which represent a simple genetic relationship to the original hydroxylated compound and still contain at least 4 hydroxyl radicals.

Obviously there is no difficulty in selecting a suitable reactant by tests which are so simple that they hardly require explanation. Selection involves, in the main, the following determinations: (a) Molecular weight based either on known structure, known synthesis, or an actual molecular weight determination by conventional procedure. If the compound has a molecular weight of 1200 or less it is suitable; (b) the compound must be water-insoluble; (c) the compound must be xylene-insoluble; (d) the compound must be at least one with 4 hydroxyl radicals; (e) the compound must be free from any radical having at least 8 uninterrupted carbon atoms; (f) the compound must be oxypropylation susceptible and this, of course, follows by the mere presence of reactive hydroxyls; (g) the compound should preferably be stable at approximately 150°–170° C.; and (h) the compound on oxypropylation with 7 to 70 moles of propylene oxide per reactive hydroxyl should become xylene-soluble.

As previously stated, the methods of making such tests are obvious. Heat stability can be determined by merely heating the product alone in the presence of 1% of alkali in absence of oxygen as, for example, under a blanket of nitrogen gas, noting color changes or chemical changes; susceptibility to propylene oxide can be determined by simply using the small autoclave although, as previously pointed out, heat stability at 150°–170° C. in presence of 1% of an alkaline catalyst, provided the compound has reactive hydroxyls, invariably and inevitably characterizes it as being oxypropylation susceptible. Needless to say, oxypropylation does not have to be carried out at 150° to 170° C., if the compound is not stable and, as a matter of fact, I have conducted oxypropylation successfully at lower temperatures, for instance, at slightly above the boiling point of water, such as 105°, 115° or 120° C.

In light of what has been said in the foregoing summarizations of the invention in its various aspects and in the claims, reference to monomeric is obviously not intended to exclude polypentaerythritols but is intended to differentiate from polyesters of the dimeric or higher polymeric type obtained, for example, by reaction between dipentaerythritol, tripentaerythritol, or the like, and adipic acid or some other selected dicarboxy or polycarboxy acid.

As to similar products to those already mentioned which meet all the prescribed requirements except molecular weight, i. e., the molecular weight is significantly greater than 1200, it is desired to point out that such products can be used as initial raw materials in the same manner as those herein specified to yield valuable derivatives suitable for all the purposes set forth and particularly for resolution of petroleum emulsions of the water-in-oil type.

In connection with materials exemplified by the polyerythritols, it is to be noted that they are susceptible to melting without decomposition which is, at least in part, an indication of low molecular weight for the reason that high molecular weight materials having somewhat similar characteristics undergo pyrolysis without melting.

PART 2

The oxypropylation procedure employed in the preparation of derivatives from polyhydric reactants has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge; manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range, for instance, in most cases I have selected a point of approximately 160° to 165° C., as being particularly desirable and stayed within the range of 155° to 180° almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam, in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment. As an illustration of such oxypropylation procedure, the following examples are included:

Example A

The polyhydric reactant employed was finely powdered dipentaerythritol. This material was substantially insoluble in cold water. It did not melt at the preferred temperature of oxypropylation (150° to 180° C.) and it is not soluble in xylene. For this reason the initial stages of oxypropylation are best carried out by adding enough xylene to give a paste or suspension which can be stirred in the autoclave, along with the sodium methylate. However, in the early stages and almost invariably at the end of the first oxypropylation stage where 5 to 15 moles of propylene oxide are added per mole of initial reactant, the intermediate product became a liquid but not necessarily xylene soluble. As soon as the intermediate product of reaction became a liquid of course subsequent control was greatly simplified. This presented no problem in the case of a small autoclave in the laboratory; however, in the large scale manufacture there would be a problem in handling the initial pasty suspension or mass. Correctly designed equipment must be employed. 508 grams of dipentaerythritol were charged into the autoclave along with 25 grams of sodium methylate and 300 grams of xylene. Before starting the operation the autoclave was flushed out with nitrogen. The bomb reservoir served as a holder for propylene oxide (which has been described previously) and was charged with more than 870 grams of propylene oxide so that 870 grams could be withdrawn by difference and noted on the scale. It is inconvenient to attempt to withdraw all the propylene oxide from the bomb reservoir for the reason that the exit tube does not go to the very bottom of the bomb. In this particular experiment the stirring speed employed was approximately 300 R. P. M. The temperature in the autoclave was raised to 150° C. before any oxide was added. At this temperature and with rapid stirring as indicated, reaction apparently took place just as rapidly as if there had been a homogeneous mass. Before starting the experiment a range of 150° to 180° C. was selected. Subsequent control of valves, reaction inlet, cooling water, steam, etc., were employed so as to keep the experiment within this range. No difficulty was involved in connection with this phase of the reaction. When the temperature reached 150° C., propylene oxide was forced in using nitrogen pressure on the reservoir bomb. The reaction mass, due to the presence of xylene, showed a pressure of approximately 15 to 25 pounds gauge pressure prior to the addition of propylene oxide. The nitrogen pressure on the propylene oxide reservoir was 100 pounds which meant that due to the conventional check gauge arrangement propylene oxide could not be forced into the autoclave for reaction if at any time the pressure in the reactor moved above 100 pounds gauge pressure. In actual operation the 870 grams of propylene oxide were added in a little less than 2 hours and at no time was the pressure over 86 pounds. The reaction operated smoothly notwithstanding the fact that, at least in the initial stage, it was a heterogeneous mass. At no time did the temperature go above the maximum selected temperature of 180° C. The bulk of the reaction took place at the range of 160° to 172° C.

It will be noted that the amount of propylene oxide added was approximately 7.5 moles for each mole of dipentaerythritol. Stated another way, a little better than a mole of propylene oxide was added for each reactive hydroxyl.

The product of reaction from this first stage was not water-soluble and was not xylene-soluble. The product was prepared essentially to be used as an intermediate material for further oxypropylation as described in subsequent steps.

Example B

The initial reactant was 839 grams of the intermediate of Example A, preceding (representing 689 grams of reaction mass and 150 grams of xylene). To the initial product (7.5 moles to 1 mole) there were added 870 grams of propylene oxide without the addition of any more catalyst. For all practical purposes the operating conditions as to temperature, etc., were the same as in Example A, preceding, except that the pressure was not as high, probably due to the lower proportion of xylene being used. The product of reaction at this second stage represented a molal ratio of approximately 22.5 moles of propylene oxide per mole of dipentaerythritol, or approximately 3.75 moles of propylene oxide per hydroxyl radical.

The product was water-insoluble and showed a tendency to dissolve in xylene although it seemed to settle out on standing.

It is to be noted that this intermediate range represents a class of material which, although still water-insoluble and still not completely xylene-soluble, are valuable for many purposes such as demulsification of water-in-oil emulsions, but are not included as part of the instant invention, which is limited to such stage of oxypropylation where the product is soluble in xylene.

Example C

The initial reactant was 855 grams of Example B, preceding. This represented essentially 780 grams of the reaction product (molal ratio 22.5 moles to 1) and 75 grams of xylene. To this mixture there were added 5 grams of sodium methylate and 870 grams of propylene oxide. The procedure in every respect was substantially the same as in Example A, preceding, except that the pressure was even lower than in Example B, to wit, in the neighborhood of 25 pounds initially before propylene oxide was added. The end product in this instance showed distinct xylene solubility and was, of course, water-insoluble. It is to be noted that this particular product represented a molal ratio of approximately 52.5 moles of propylene oxide per mole of dipentaerythritol, or approximately 8.75 moles of propylene oxide per hydroxyl. The product represented (ignoring the xylene present) 1 mole of dipentaerythritol combined with 52.5 moles of propylene oxide, or approximately 7.7% of dipentaerythritol and 93.5% propylene oxide. This end product was a fair demulsifier for a number of oils produced in fields in West Columbia, Texas.

Example D

The initial reactant was 862 grams of Example C, preceding. This represented 825 grams of the reaction product and 37.5 grams of xylene. The total amount of propylene oxide added was 870 grams. The operation was conducted in exactly the same manner as in Example A, preceding, and the only difference was that the time of reaction was distinctly longer, requiring 2¾ hours instead of about 2 hours. It is to be noted, however, that no additional catalyst was added at this stage. If a small amount of catalyst had been added the reaction probably would have speeded up. This is exactly what happened in the next or final stage. The molal ratio of propylene oxide to dipentaerythritol was approximately 112.5 to 1. On a percentage basis the end product represented approximately 3.75% of pentaerythritol and approximately 96.25% of propylene oxide. When this product was tested as a demulsifying agent on the same Texas oils referred to in Example C, preceding, it was found to be distinctly better, and in some instances 20% to 25% better. This product was, of course, water-insoluble and xylene-soluble.

Example E

The initial reactant employed was Example D, described immediately preceding. 866 grams of this material were employed which represented 847.25 grams of the reaction product and 18.75 grams of xylene. 4 grams of sodium methylate were added and 290 grams of propylene oxide added in the same manner as described in the preceding steps. The reaction speeded up and took place in approximately 1½ hours. In all other respects, the pressure was the same as in the preceding examples, although the maximum pressure at no point was more than 25 to 30 pounds gauge pressure. This final product represented about 152.5 moles of propylene oxide per mole of dipentaerythritol. The final product had a molecular weight, assuming complete reaction, of approximately 9,100, of which approximately the value of 254 was represented by dipentaerythritol. Thus, in the final product the dipentaerythritol represented less than 3% of the ultimate composition and propylene oxide represented approximately 97%.

On the particular West Columbia oils previously tested this stage did not show more effective demulsifying action than did Example D, preceding.

Example F

The same series of five compounds described above were prepared from tripentaerythritol. The same molal ratios were preserved. The entire series of reactions took place in exactly the same manner and the characteristics of each stage were substantially the same as the analogous or corresponding stage using dipentaerythritol.

By and large, the products obtained from tripentaerythritol were distinctly better as demulsifiers, particularly in the C, D and E stages, and in this instance the final product corresponding to Example E, preceding (E stage), seemed to be the best of the three final stages which were tested. In a general way the tripentaerythritol in the same molal ratio seemed to be about 12% to 15% better as a demulsifier than the corresponding products of dipentaerythritol.

Where sodium methylate has been used as a catalyst, needless to say, any of the other conventional alkaline catalysts, such as caustic soda, caustic potash, etc., can be used.

What is said herein applies not only to the preceding examples but also to the examples in subsequent tables.

Some of the derivatives obtainable from the polypentaerythritols are not solids, as is true of the unmodified compounds, but are either pastes or semi-solids, or mush-like materials, or in some cases viscous liquids. So long as the materials are liquid at the temperature of reaction, 150° C. or somewhat higher, one need not necessarily add xylene. However, xylene can be added even though the product happens to be a liquid. All such products are, of course, xylene-soluble and if xylene is added the mass is still a heterogeneous reaction mixture, at least in the early stages as in Example A, preceding.

Pentaerythritol, and in fact the polypentaerythritols herein described, can be treated with ethylene oxide using the same equipment in the same manner as treatment of propylene oxide. As a matter of fact, either an alkaline catalyst can be used or boric anhydride can be added (see U. S. Patent No. 1,922,459).

Needless to say, in all the various examples the xylene remaining in the residual product can be removed by distillation, particularly vacuum distillation. This also would be true of any other suitable solvent which may have been used. For the majority of purposes, however, such as preparation of many derivatives and for use as demulsifiers, the xylene or other solvent may remain in the final product.

Further examples are presented in Tables 2, 3, and 4. Here, again, the same equipment was used as in Examples A through F, inclusive. The operating conditions were the same and all the significant data are included.

It will be noted that some of the reactants employed were obtained by the action of glycide on selected polyhydric reactants. Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible, as the effect of impurities are difficult to evaluate ; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the copending application of Melvin De Groote and Bernhard Keiser, Serial No. 82,704, filed March 21, 1949 (now Patent Number 2,499,370, dated March 7, 1950), and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this section; but in any event, when the initial amount of glycide is added to a suitable reactant, such as sorbitol, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

TABLE 1

| Example No. | Polyhydric Chemical Compound or Prior Derivative | Mol. Wt. | No. of Hydroxyl Radicals | Amt., Grms. | Grams Xylene Added | Amt. of Sod. Meth. Added if any | Amt. of Propylene Oxide Added Grms. | Molal Ratio per Initial Molecule | Molal Ratio per Initial Hydroxyl Radical | Mol. Wt. of Derivative |
|---|---|---|---|---|---|---|---|---|---|---|
| 1 | Tetrapentaerythritol | 490 | 10 | 490 | 300 | 25 | 1,160 | 20 | 2 | 1,650 |
| 2 | Dipentaerythritol monoacetate | 296 | 5 | 296 | 300 | 30 | 1,160 | 20 | 4 | 1,456 |
| 3 | Tripentaerythritol monoacetate | 414 | 7 | 414 | 300 | 20 | 1,160 | 20 | 3 | 1,574 |
| 4 | Monoglycerol ether of tripentaerythritol. | 446 | 9 | 446 | 300 | 22 | 1,160 | 20 | 2.2 | 1,606 |
| 5 | Monoglycerol ether of tetrapentaerythritol. | 564 | 11 | 564 | 300 | 28 | 1,160 | 20 | 1.9 | 1,724 |
| 6 | Monoethylene glycol ether of tripentaerythritol. | 416 | 8 | 416 | 300 | 21 | 1,160 | 20 | 2.5 | 1,576 |
| 7 | Monoethylene glycol ether of tetrapentaerythritol. | 534 | 10 | 534 | 300 | 27 | 1,160 | 20 | 2.0 | 1,694 |
| 8 | Monoacetate of monoglycerol ether of tripentaerythritol. | 488 | 8 | 488 | 300 | 25 | 1,160 | 20 | 2.5 | 1,648 |
| 9 | Monoacetate of monoethylene glycol ether of tripentaerythritol. | 458 | 7 | 457 | 300 | 23 | 1,160 | 20 | 3 | 1,617 |
| 10 | Monopropionate of glycerol ether of tripentaerythritol. | 501 | 8 | 501 | 300 | 25 | 1,160 | 20 | 2.5 | 1,661 |

TABLE 2

| Example No. | Polyhydric Chem. Cmpd. or Prior Derivative | Molec. Weight | No. of Hydroxyl Radicals | Amt., Grams | Amt. of Sod. Meth. Added, if any | (Grms.) Amt. of Propylene Oxide Added | Molec. Wt. of Derivative | Xyl. Solubility | Water Solubility |
|---|---|---|---|---|---|---|---|---|---|
| 11 | Ex. 1 | 1,650 | 10 | 413 | None | 870 | 5,130 | Yes | No. |
| 12 | Ex. 2 | 1,456 | 5 | 384 | do | 870 | 4,936 | Yes | No. |
| 13 | Ex. 3 | 1,574 | 7 | 393 | do | 870 | 5,054 | Yes | No. |
| 14 | Ex. 4 | 1,606 | 9 | 401 | do | 870 | 5,086 | Yes | No. |
| 15 | Ex. 5 | 1,724 | 11 | 431 | do | 870 | 5,204 | Yes | No. |
| 16 | Ex. 6 | 1,576 | 8 | 394 | do | 870 | 5,056 | Yes | No. |
| 17 | Ex. 7 | 1,694 | 10 | 423 | do | 870 | 5,174 | Yes | No. |
| 18 | Ex. 8 | 1,648 | 8 | 412 | do | 870 | 5,128 | Yes | No. |
| 19 | Ex. 9 | 1,617 | 7 | 404 | do | 870 | 5,097 | Yes | No. |
| 20 | Ex. 10 | 1,661 | 8 | 415 | do | 870 | 5,141 | No | No. |

TABLE 3

| Example No. | Polyhydric Chem. Cmpd. or Prior Derivative | Molec. Weight | No. of Hydroxyl Radicals | Amt., Grams | Grams Sod. Meth. Added, if any | Grams of Propylene Oxide Added | Molec. Wt. of Derivative | Xyl. Solubility | Water Solubility |
|---|---|---|---|---|---|---|---|---|---|
| 21 | Ex. 11 | 5,130 | 10 | 513 | 6 | 232 | 7,450 | Yes | No. |
| 22 | Ex. 12 | 4,936 | 5 | 493 | 6 | 232 | 7,236 | Yes | No. |
| 23 | Ex. 13 | 5,054 | 7 | 505 | 6 | 232 | 7,374 | Yes | No. |
| 24 | Ex. 14 | 5,086 | 9 | 509 | 6 | 232 | 7,406 | Yes | No. |
| 25 | Ex. 15 | 5,204 | 11 | 520 | 6 | 232 | 7,524 | Yes | No. |
| 26 | Ex. 16 | 5,056 | 8 | 506 | 6 | 232 | 7,376 | Yes | No. |
| 27 | Ex. 17 | 5,174 | 10 | 517 | 6 | 232 | 7,494 | Yes | No. |
| 28 | Ex. 18 | 5,128 | 8 | 513 | 6 | 232 | 7,428 | Yes | No. |
| 29 | Ex. 19 | 5,097 | 7 | 510 | 6 | 232 | 7,417 | Yes | No. |
| 30 | Ex. 20 | 5,141 | 8 | 514 | 6 | 232 | 7,461 | Yes | No. |

TABLE 4

| Example No. | Polyhydric Chem. Cmpd. or Prior Derivative | Molec. Weight | No. of Hydroxyl Radicals | Amt., Grams | Grams Sod. Meth. Added, if any | Grams of Propylene Oxide Added | Molec. Wt. of Derivative | Xyl. Solubility | Water Solubility |
|---|---|---|---|---|---|---|---|---|---|
| 31 | Ex. 21 | 7,450 | 10 | 745 | 5 | 290 | 10,350 | Yes | No. |
| 32 | Ex. 22 | 7,236 | 5 | 724 | 5 | 290 | 10,136 | Yes | No. |
| 33 | Ex. 23 | 7,374 | 7 | 737 | 5 | 290 | 10,274 | Yes | No. |
| 34 | Ex. 24 | 7,406 | 9 | 741 | 5 | 290 | 10,306 | Yes | No. |
| 35 | Ex. 25 | 7,524 | 11 | 752 | 5 | 290 | 10,424 | Yes | No. |
| 36 | Ex. 26 | 7,376 | 8 | 738 | 5 | 290 | 10,276 | Yes | No. |
| 37 | Ex. 27 | 7,494 | 10 | 750 | 5 | 290 | 10,394 | Yes | No. |
| 38 | Ex. 28 | 7,428 | 8 | 743 | 5 | 290 | 10,328 | Yes | No. |
| 39 | Ex. 29 | 7,417 | 7 | 742 | 5 | 290 | 10,317 | Yes | No. |
| 40 | Ex. 30 | 7,461 | 8 | 746 | 5 | 290 | 10,361 | Yes | No. |

Water-solubility of the initial reactant, such as dipentaerythritol or tripentaerythritol, is used in the ordinary sense to mean solubility at ordinary temperature, corresponding either to practically zero solubility or only one-tenth, two-tenths or three-tenths at the most. In fact, the solubility of dipentaerythritol may be considered as exemplifying the upper limit of water-solubility. All the other compounds have even less solubility. For certain purposes dipentaerythritol is not considered water-soluble.

The products obtained by oxypropylation generally vary in color from almost water-white through pale amber. Needless to say, if the initial raw material is darker in color there is less reduction in color as oxypropylation proceeds. The final products, however, have a viscosity comparable to castor oil or somewhat less and have a pale amber appearance or color which can be eliminated, if desired, by means of charcoal or any other suitable physical bleaching agent.

I have prepared a large variety of oxypropylated derivatives, particularly within the range of 3,000 to 10,000 or 15,000, and the color seems to be much the same except when darker colored nitrogenous products are used as the initial reactant.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agents of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000, as in desalting practice, such an apparent insolubility in oil and water is not significant because said reagents undoubtedly have solubility within such concentrations. This same face is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixtures. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example D, or the corresponding product obtained in the same molal ratio from tripentaerythritol instead of dipentaerythritol, with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. For example, a mixture which exemplifies such combination is the following:

Oxypropylated derivative of tripentaerythritol corresponding to Example D, and obtained by reaction of one mole of tripentaerythritol with 112.5 moles of propylene oxide, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Another class of derivative is that obtained from the water-insoluble xylene-soluble compounds, described in the previous section, by further treatment with either ethylene oxide or glycide, or both, so as to reduce the xylene solubility and water-insolubility to an intermediate stage where the two effects have been modified so that the product still meets the requirement of water-insolubility and xylene-solubility; or else carrying out the oxyalkylation with ethylene oxide alone, or glycide alone, or the two together, to a stage where xylene-solubility begins to disappear and water-solubility begins to appear, or even further, to the point where the product again is water-soluble and xylene-insoluble.

The same treatment, of course, can be applied to the numerous derivatives previously mentioned in this particular section, and particularly to the partial esters; or, for that matter, valuable products can be obtained by following the procedures above outlined, i. e., treatment with ethylene oxide alone or glycide alone, or a combination of the two, so as to give increased water-solubility and decreased xylene-solubility; or, for that matter, complete water-solubility and complete xylene-insolubility, and then esterifying such products or otherwise reacting such products in the manner described in the preceding part of this section in regard to the oxypropylation products, per se.

Attention is directed also to another variety of related compounds which are obtained by treating the hydroxylated initial reactants herein described with acids, particularly monocarboxy acids, and especially the high molal monocarboxy acids such as higher fatty acids, so as to produce a partial ester, and then treating such ester with propylene oxide in the manner described. Such ester may be illustrated by sorbitol mono-oleate or sorbitol mono-oleate which has been treated with ethylene oxide to promote water-solubility, or the mono-oleate of oxyethylated sorbitol. Into such esters one can still introduce the peculiar effect noted by a large plurality of propylene ether radicals as herein described, to yield products which are not only valuable in demulsification of petroleum emulsions of the water-in-oil type but also for numerous other purposes, such as the preparation of emulsions for a variety of technical purposes.

In the type described immediately preceding, one may replace ethylene oxide with glycide, or a combination of ethylene oxide and glycide.

The polyhydric reactants herein employed for combination with propylene oxide, are composed of carbon, oxygen, and hydrogen. There are a variety of polyhydric reactants having structures comparable to those herein described containing same additional element, such as nitrogen, sulfur, chlorine, etc., which are equally acceptable as a far material or initial reactant for combination with propylene oxide to yield derivatives of the same solubility characteristics, the same molecular weight range, and being effective for resolution of petroleum emulsions of the water-in-oil type. Such compounds may contain three or more hydroxyls, or an equivalent functional group such as a hydrogen atom attached to a sulfur atom, or attached to a nitrogen atom, and those which are particularly effective are those having at least 4 hydroxyl radicals in the molecule, or a total of at least 4 functional groups which are susceptible to reaction with propylene oxide as in ethylene diamine. Obviously a large number of amines will serve, such as ammonia, alkanolamines, including ethanolamines, propanolamines, butanolamines, ethylene diamine, diethylene triamine, and the higher ethylene polyamines, such as tetraethylene pentamine, pentaethylene hexamine, etc. Similarly, ethylethanolamine, ethylpropanolamine, or the like can be treated with glycide to produce a suitable reactant. Similarly, the large number of amines enumerated earlier in this section may be treated with glycide so as to yield compounds having 10, 15, 20 or even more hydroxyl radicals per molecule.

Having thus described my invention, what I claim as new and desire to secure by Letters Patent, is

1. A process for breaking petroleum emulsions of the water-in-oil type characterized by subjecting the emulsion to the action of a demulsifier including high molal oxypropylation derivatives of monomeric polyhydric compounds, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristic of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant.

2. A process for breaking petroleum emulsions of the water-in-oil type characterized by subjecting the emulsion to the action of a demulsifier including high molal oxypropylation derivatives of monomeric heat-resistant polyhydric compounds, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis; (i) the preceding provisos being based on complete reaction involving the propylene oxide and the initial polyhydric reactant, and (j) said heat-resistance meaning stability at 150° to 170° C., in presence of approximately 1% of an alkaline catalyst and in absence of an oxidized medium, such as air.

3. A process for breaking petroleum emulsions of the water-in-oil type characterized by subjecting the emulsion to the action of a demulsifier including high molal oxypropylation derivatives of monomeric heat-resistant polyhydric compounds, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis; (i) the preceding provisos being based on complete reaction involving the propylene oxide and the initial polyhydric reactant; (j) said heat-resistance meaning stability at 150° to 170° C., in presence of approximately 1% of an alkaline catalyst and in absence of an oxidized medium, such as air, and (k) the oxygen present in the initial polyhydric reactant be in the form of a radical selected from the class consisting of hydroxyl radicals, ether radicals, inner ether radicals, ester radicals containing a low molal monoacyl radical, ester radicals containing a low molal alkyl radical, ketone radicals, aldehyde radicals, carboxy radicals, ketal radicals and acetal radicals.

4. A process for breaking petroleum emulsions of the water-in-oil type characterized by subjecting the emulsion to the action of a demulsifier including high molal oxypropylation derivatives of polypentaerythritols, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis; and (i) the preceding provisos being based on complete reaction involving the propylene oxide and the initial polyhydric reactant.

5. A process for breaking petroleum emulsions of the water-in-oil type characterized by subjecting the emulsion to the action of a demulsifier including high molal oxypropylation derivatives of polypentaerythritols, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-insoluble and xylene-insoluble; (d) the oxypropylation end product be water-insoluble and xylene-soluble; (e) the oxypropylation end product be within the molecular weight range of 3,000 to 15,000 on an average statistical basis; (f) the solubility characteristics of the oxypropylation end product in respect to xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis; and (i) the preceding provisos being based on complete reaction involving the propylene oxide and the initial polyhydric reactant.

6. The process of claim 5 wherein the polypentaerythritol is dipentaerythritol.

7. The process of claim 5 wherein the polypentaerythritol is tripentaerythritol.

8. The process of claim 5 wherein the polypentaerythritol is tetrapentaerythritol.

MELVIN DE GROOTE.

REFERENCES CITED

The following references are of record in the file of this patent:

UNITED STATES PATENTS

| Number | Name | Date |
| --- | --- | --- |
| 2,233,383 | De Groote et al. | Feb. 25, 1941 |
| 2,278,838 | De Groote et al. | Apr. 7, 1942 |
| 2,281,419 | De Groote et al. | Apr. 28, 1942 |
| 2,397,058 | Moeller | Jan. 5, 1943 |
| 2,430,002 | De Groote et al. | Nov. 4, 1947 |
| 2,454,541 | Bock et al. | Nov. 23, 1948 |